United States Patent
Talwar et al.

(10) Patent No.: US 7,320,129 B2
(45) Date of Patent: Jan. 15, 2008

(54) NATIVE LANGUAGE VERIFICATION SYSTEM AND METHOD

(75) Inventors: Vanish Talwar, Mountain View, CA (US); Dongni Chen, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 10/439,052

(22) Filed: May 14, 2003

(65) Prior Publication Data

US 2004/0230949 A1    Nov. 18, 2004

(51) Int. Cl.
| | |
|---|---|
| G06F 7/38 | (2006.01) |
| G06F 9/00 | (2006.01) |
| G06F 9/44 | (2006.01) |
| G06F 15/00 | (2006.01) |
| G06F 9/455 | (2006.01) |
| G06F 9/45 | (2006.01) |

(52) U.S. Cl. ................... 718/1; 712/227; 712/228; 718/1; 717/118; 717/148; 717/154; 717/159

(58) Field of Classification Search ............ 718/1; 712/227; 717/118, 148, 154, 159
See application file for complete search history.

(56) References Cited

U.S. PATENT DOCUMENTS

| | | | | |
|---|---|---|---|---|
| 2002/0087893 | A1* | 7/2002 | Shpiro et al. | 713/202 |
| 2002/0194579 | A1* | 12/2002 | Dollin et al. | 717/126 |
| 2004/0003380 | A1* | 1/2004 | Fedorov | 717/148 |
| 2005/0044542 | A1* | 2/2005 | Grimaud et al. | 717/174 |

OTHER PUBLICATIONS

Yelland, P. "A compositional account of the Java virtual machine", Proceedings of the 26th ACM SIGPLAN-SIGACT symposium on Principles of programming languages, Jan. 1999, ACM Press, pp. 57-69. □□□□.*

* cited by examiner

*Primary Examiner*—Donald Sparks
*Assistant Examiner*—Jesse Moll (57) ABSTRACT

The present invention includes a native language verification method for verifying native language information associated with an emulation class. Verification information associated with native language code is obtained. The native language code is referred to by an emulation language class. The legitimacy of the verification information is examined to confirm the native language is uncorrupted.

4 Claims, 11 Drawing Sheets

Creating emulation language code and native language code associated with the emulation language code.

402

Deriving bytecode verification information from the emulation language code and embedding the bytecode verification information with the native language code.

403

Creating native language verification information and embedding it with the emulation language code.

410 → Creating a virtual machine.

420 → Performing a loading process, including verification of native language information.

430 → Executing loaded emulation application instructions.

520
Obtaining verification information associated with native language code.

530
Examining the legitimacy of the obtained verification information.

NATIVE LANGUAGE VERIFICATION SYSTEM AND METHOD

FIELD OF THE INVENTION

The present invention relates to programming devices. More particularly, the present invention relates to loading native language code.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating information in most areas of business, science, education and entertainment. Systems providing these advantageous results often involve information processing activities that depend upon accurate and reliable process steps or instructions. However, maintaining confidence that the instructions are secure and reliable can be difficult and is often problematic.

Numerous electronic devices include processors that operate by executing programs comprising a series of instructions. These programs and their series of instructions are typically referred to as software. Software instructions include directions that guide processor device functions in the performance of useful tasks. The software code is often expressed in different configurations or languages. Source code is usually expressed in one manner and compiled into a different expression. For example, emulation or virtual language (e.g., Java) source code is typically compiled into bytecode.

There can be significant differences between different types of code expression. Emulation languages (e.g., Java) typically offer flexible programming advantages. Emulation language code is usually more portable and mobile between system platforms than code that is native to a particular single platform. However, native languages usually offer significant potential performance advantages. For example, native languages can usually be optimized for particular system hardware architectures (e.g., an embedded processor) in a manner that significantly increases capability and speed. Native languages also often permit implementation of specialized functionality or features (e.g., utilization of embedded system functionality and features).

Java is one example of a high level emulation language that offers significant advantages over native languages. Java characteristics of platform independence, security, and network mobility make it particularly suitable for emerging distributed network computing environments. A Java program typically runs on a Java platform that interacts with the underlying computer system resources through application program interfaces (APIs). Since there is significant diversity of interfaces available for interacting between a Java program and various underlying operating systems, Java is relatively platform independent. This enables Java to be an effective language for distributed or network environment programming without the need for extensive specialized adaptation to the variety of devices potentially included in a network system.

Although many of Java's characteristics are desirable, Java performance may not be optimal for a particular application. For example, instructions in Java language sometimes take longer to process than code in a native language. In some instances this can be overcome or at least mitigated by having a Java "call" to native language code (e.g., native language methods or subroutines). For example, native language methods can be utilized to speed up performance of time critical code, utilizing legacy system data, and/or accessing features of an underlying host platform that are otherwise unaccessible in Java. However, calling native language files can be problematic. Traditional Java security is primarily focused at the class file level and not the native language level. For example, conventional Java security usually focuses on protecting the "borders" of "trusted" class libraries by preventing "untrusted" classes from pretending to be trusted, but it did not address the corruption of native language files associated with the "interior" attributes or methods of a "trusted" class. Historically, a call to a native language file bypasses the protection of traditional Java security sandboxes and security managers.

Native language files are not usually protected by intrinsic security features. Corrupted native language can easily overcome security features of Java when native language code files are called by a Java class if the native language code file has been corrupted. Native language files can be particularly troublesome if corrupted (e.g., bits altered by a malicious user, virus, etc.) because they are closer to and permit deeper penetration into the operating system. For example, native code usually has pointers and the pointers can be altered to point to an incorrect address. Malicious alteration of native code can result in overwriting a memory block with "bad" data, cause a buffer to overflow and/or include a virus. The occurrence of Java applications having calls to native methods communicated in a network environment further exacerbates the security problems since networks are usually prolific targets of security attacks. For example, it is usually convenient to download native code associated with printer drivers over the Internet and if native code is altered before it is called by emulation code, undesirable and undetected consequences can occur (e.g., an instruction to print to a local secure printer can be altered to send duplicate copies to a remote unsecured printer, etc.).

SUMMARY OF THE INVENTION

The present invention includes a native language verification method for verifying native language information associated with an emulation class. Verification information associated with native language code is obtained. The native language code is referred to by an emulation language class. The legitimacy of the verification information is examined to confirm the native language is uncorrupted.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here generally conceived to be a sequence of steps or instructions that guide operations of a system to a desired result. The steps include physical manipulations of physical quantities. Usually, though not necessarily, these quantities take the form of electrical, magnetic, optical, or quantum signals capable of being stored, transferred, combined, compared, and otherwise manipulated in a processing system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum computing device), that manipulates and transforms data represented as physical (e.g., electronic) quantities. The terms refer to actions and processes of the processing devices that manipulate or transform physical quantities within a system's components (e.g., registers, memories, other such information storage, transmission or display devices, etc.) into other data similarly represented as physical quantities within the same or other components.

The present invention facilitates security measures directed towards preventing illegitimate or malicious tampering with native language information associated with emulation applications (e.g., Java applications). In one embodiment of the present invention, the verification provides an indication of native language file legitimacy (e.g., with respect to the source of the files). For example, the present invention provides assurance that native files received in association with emulation language application calls to an native language file are the correct native language file called by an emulation application and not an altered version (e.g., a version comprising a virus or malicious code). The present invention can be implemented in a manner that is compatible with standard Java conventions and specifications and also includes the additional ability to verify native language code. It is appreciated that references herein to a Java virtual machine implementation of the present invention includes the additional ability of native language code verification.

Figure 1A:
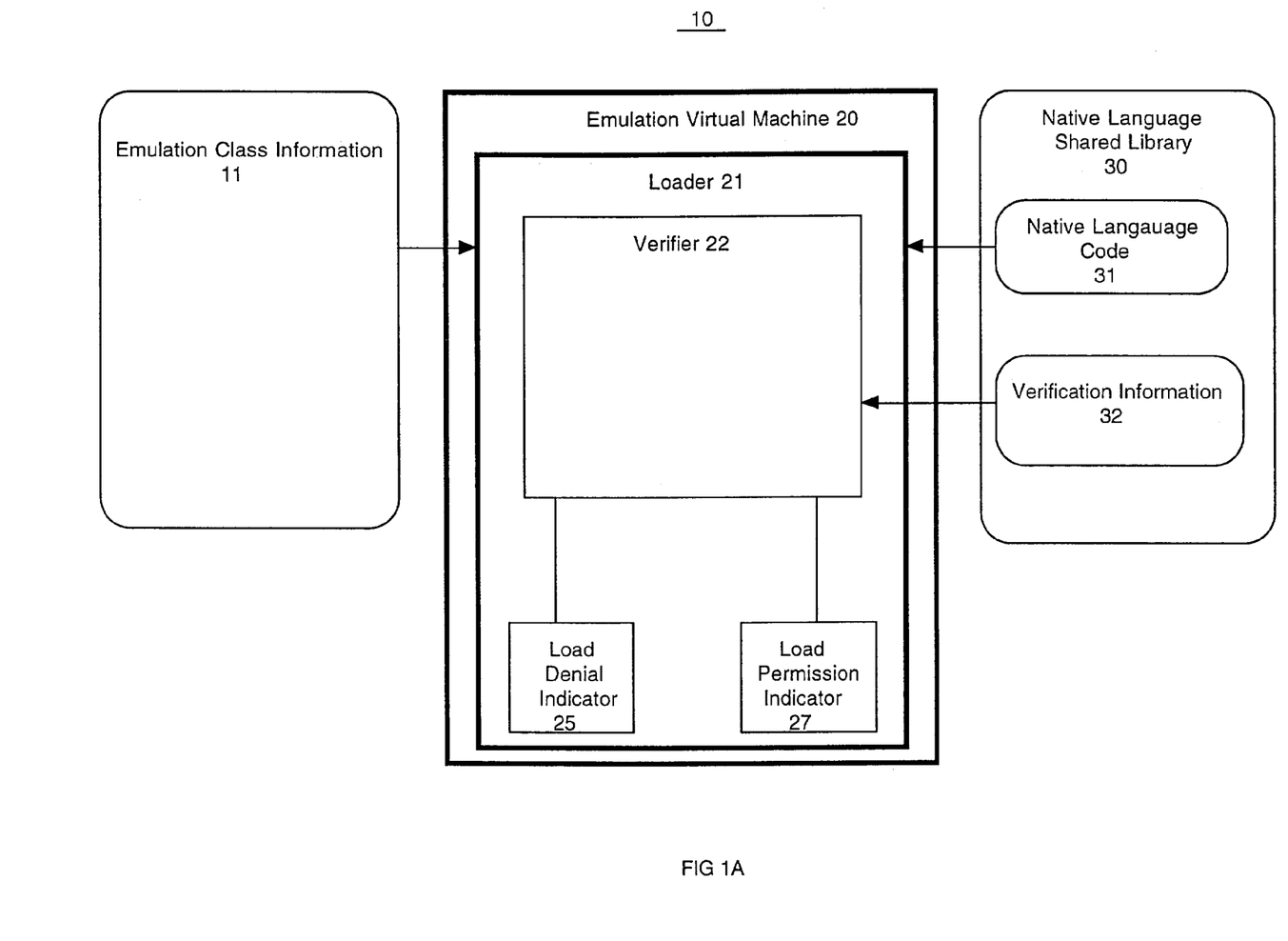
FIG. 1A is a block diagram of an emulation verification system in accordance with one embodiment of the present invention.

FIG. 1A is a block diagram of emulation verification system 10, one embodiment of the present invention. Emulation verification system 10 includes emulation class 11, emulation virtual machine 20 and native language shared library 30. Emulation class 11 includes code associated with an emulation application program. Native language shared library 30 comprises native language code 31 and verification information 32. Emulation virtual machine 20 comprises loader 21 which includes verifier module 22, load denial indicator 25 and load permission indicator 27.

In one embodiment of the present invention, emulation class 11 includes code segments (e.g., bytecode). For example, emulation class 11 can include code that defines object instances of a class (e.g., "component" characteristics or features included in the class). Emulation class 11 can include a request (e.g., a call) for code included in native language code 31. Native language code 31 includes native language instructions (e.g., a C language subroutine). Verification information 32 is utilized to verify native language code 31 is a legitimate version (uncorrupted) of code being requested by emulation class 11. In one exemplary implementation, verification information 32 can include an encoded value (e.g., a CRC value, a hash digest, etc.). The encoded value can be encrypted or signed (e.g., with a private key).

With continued reference to FIG. 1A, the components of emulation verification system 10 cooperatively operate to verify and load native language information. Verifier 22 determines if verification information 32 indicates native language code requested by emulation class 11 is legitimate by verifying information included in native language shared library 30 conforms with a predetermined relationship. In one exemplary implementation, verifier 22 determines if the information included in native language shared library 30 exhibits a predetermined correspondence to a predetermined value (e.g., matches the predetermined value). The predetermined value can be included in emulation class information and/or derived through a predetermined process (e.g., a checksum process, hash process, signature process, etc.). If the verification information does not exhibit the predetermined correspondence, verifier 22 issues load denial indicator 25 to prevent loading of native language code 31. If the verification information does exhibit the predetermined correspondence, verifier 22 issues load permission indicator 27 to continue with loading of native language code 31. Loader 21 loads files from emulation class 11 and corresponding requested native language code dynamically (e.g., loads native language code 31 during run time) from native shared library 30 if verified.

In one embodiment of the present invention, verifier 22 includes deciphering capabilities for deciphering verification information 32 if it is in a signature format. For example, if verification information 32 includes a signature created by a private key, verifier 22 has capabilities to decrypt the signature using an appropriate public key. The decrypted version of verification information 32 (e.g., a decrypted signature value bit sequence associated with native language information) can be examined for appropriate correspondence (e.g., match, have a predetermined algorithmic relationship, etc.) to a value generated on the fly or alternatively a value included in emulation class 11. It is appreciated that the present invention is readily adaptable to a variety of native language code configurations and the native language code does not necessarily have to be organized in a library configuration.

Figure 1B:
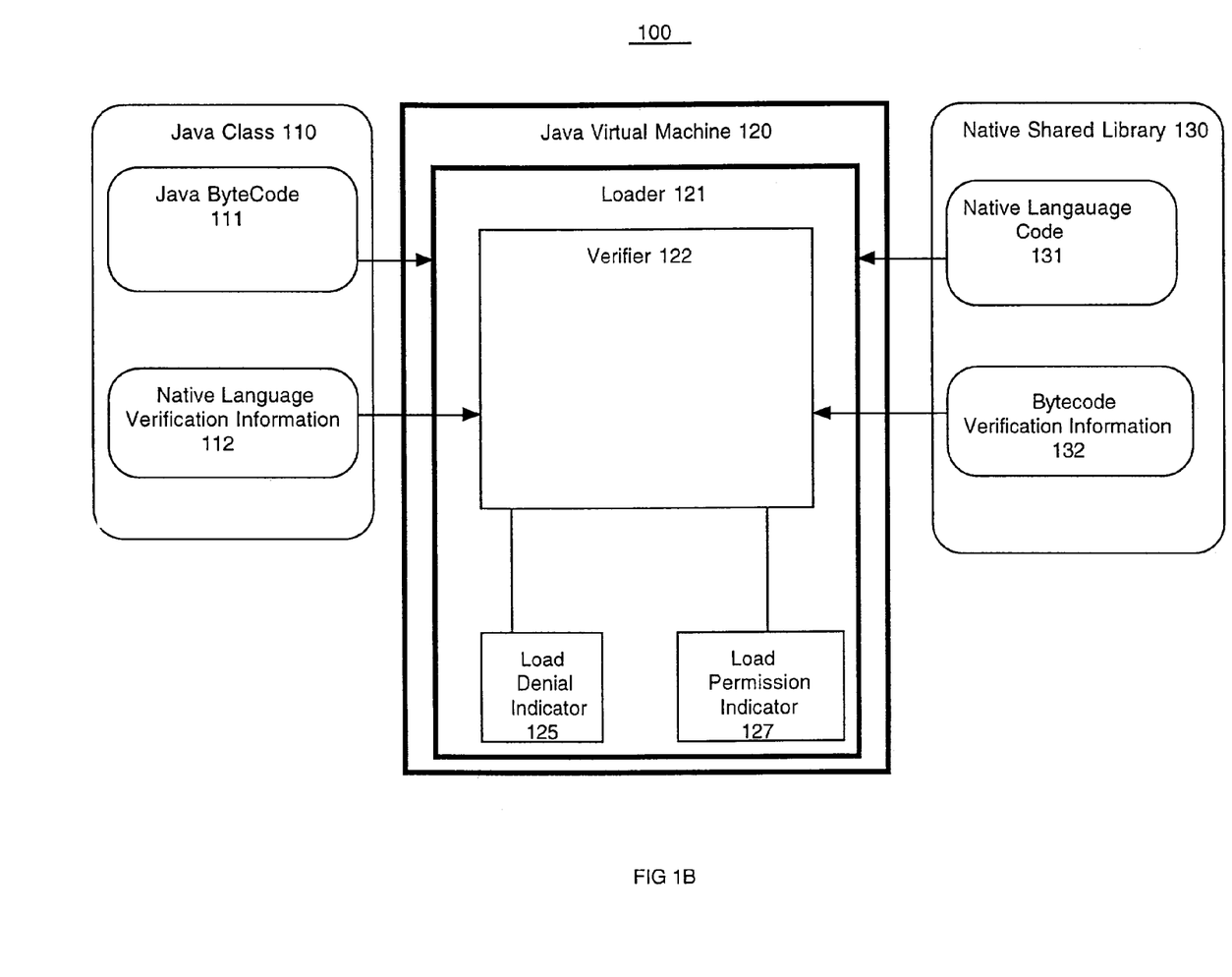
FIG. 1B is a block diagram of an exemplary Java verification system in accordance with one embodiment of the present invention.

FIG. 1B is a block diagram of Java verification system 100, one embodiment of the present invention. Java verification system 100 includes Java class 110, Java virtual machine 120 and native language shared library 130. Java class 110 comprises Java bytecode 111 and native language verification information 112. Native language shared library 130 comprises native language code 131 and bytecode verification information 132. Java virtual machine 120 comprises loader 121 which includes verifier module 122.

In one embodiment of the present invention, Java class information 110 is a code segment that includes Java bytecode 111. Java class 110 can include fields and methods that define object instances of a class. The fields or class variables ("variables") can include data (e.g., integers or characters) which can be private data accessible by a single class or public data accessible by a plurality of classes. The data can also be characterized as static data associated with class objects as a whole (e.g., common to each instance of the class) or dynamic data associated with class objects individually. The methods perform tasks or functions (e.g., a subroutine). The methods can also call other methods via invocations and/or can pass data to other objects. For example, the methods can include calls to other Java code and/or native language code.

Native shared library 130 includes native language code 131 and native language verification information 132. Native language code 131 includes native language instructions (e.g., a native language subroutine). For example, native language code 131 can include a C language function and/or subroutine.

Native language verification information 112 and bytecode verification information 132 are utilized to verify native language code. In one embodiment, encoded values are included in native language verification information 112 and bytecode verification information 132. In one exemplary implementation, native language verification information 112 includes an encoded value corresponding to native language shared library 130 (e.g., a CRC value or a hash digest of information included in native shared library 130) and bytecode verification information 132 includes an encoded value corresponding to bytecode 111 (e.g., a CRC value or a hash digest of bytecode 111).

With continued reference to FIG. 1B, the components of Java verification system 100 cooperatively operate to verify and load emulation language and native language information. Verifier 122 verifies or determines the legitimacy of native language information (e.g., native language code 131). For example, verifier 122 determines if verification information 132 and verification information 112 correctly correspond to respective predetermined relationships. The predetermined relationship can be a predetermined algorithm that generates (e.g., on the fly by verifier 122) a verification value (e.g., a load time verification value). Verifier 122 can perform predetermined algorithms on received information (e.g., from native shared library 130 and Java class 110) to establish generated values and then compare the generated values to the received verification information (e.g., native language verification information 112 and bytecode verification information 132). Verifier 122 issues load denial indicator 125 if the native verification information 132 and verification information 112 do not correctly correspond to respective predetermined relationships. Verifier 122 issues load permission indicator 127 if the native verification information 132 and verification information 112 do correctly correspond to respective predetermined relationships. If loading permission is granted, loader 121 loads files from Java class 110 and corresponding requested native language code dynamically (e.g., loads native language code 131 during run time) from native shared library 130 if verified.

In one embodiment of the present invention, class information is expressed in index values associated with an ordered listing that establishes a correlation between emulation code structures identifiers (e.g., Java classes, methods, fields, etc.) and the index values. The ordered listing comprises code structure identifiers (e.g., code structure identifiers initially established as a result of source code compiling) sorted in a sequential arrangement and mapped to index values. In one exemplary implementation, bytecode is condensed by replacing code structure identifiers included in the bytecode with corresponding index references. In one embodiment, the condensed bytecode can be interpreted and executed when expressed with index values without the ordered lists. One embodiment of a system and method in which class information is expressed in index values is described in copending patent application entitled "An Emulation Internal Representation Revision System and Method", application Ser. No. 10/439,053 filed on May 14, 2003, which is incorporated herein by reference.

Figure 1C:
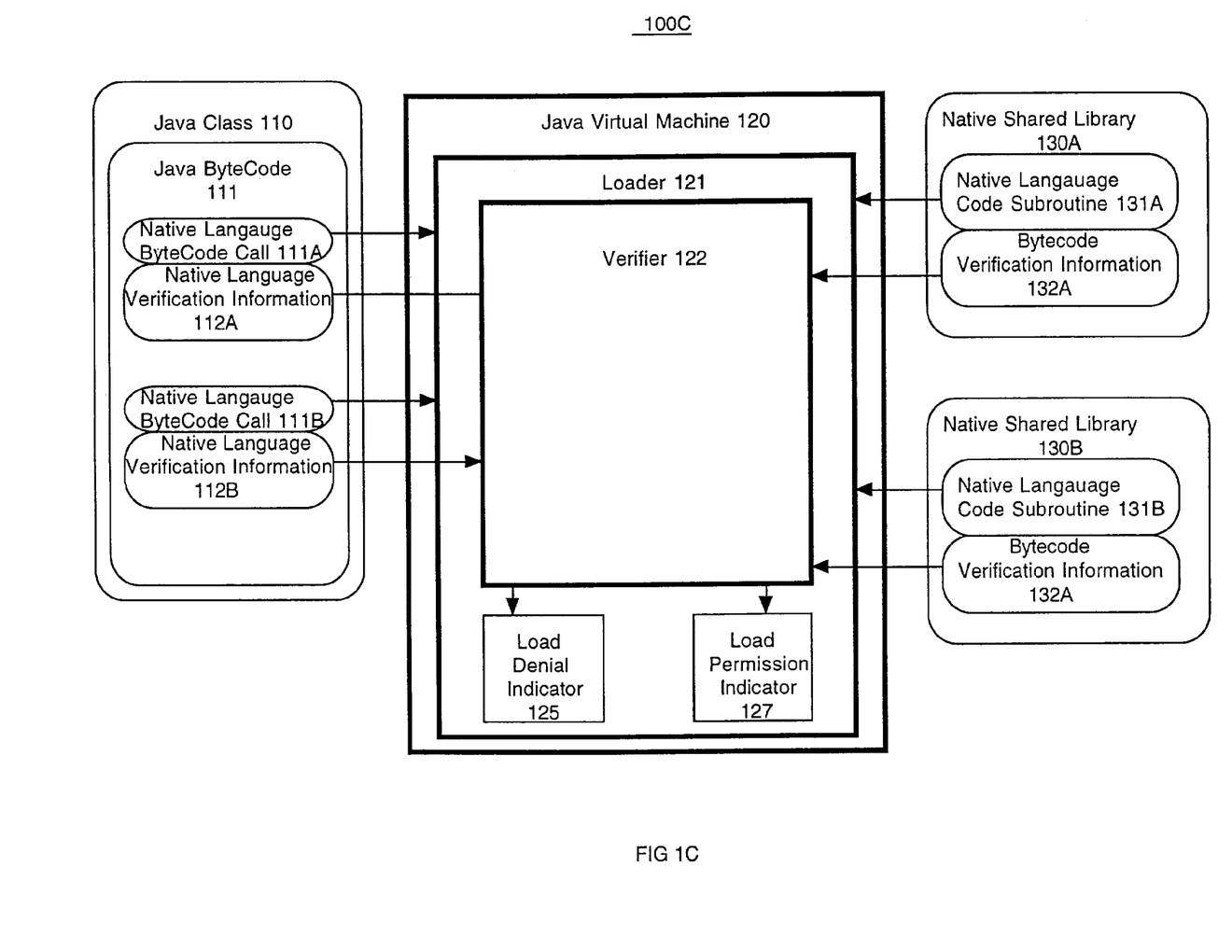
FIG. 1C is a block diagram illustrating one exemplary implementation of a Java verification system in which a native language verification information associated with multiple native language shared libraries is verified.

It is appreciated that verifier module 122 can verify information based upon a variety of native language code verification configurations. FIG. 1C illustrates an implementation in which verifier 122 can verify a native language verification information for native language code (native language codes subroutines 131A and 131B) included in different native language shared libraries (e.g., native language shared libraries 130A and 130B). Java bytecode 111A includes native language byte code call 111A and 111B for each of the native language code subroutines 131A and 131B respectively. Java bytecode 111 also includes native language verification information 112A and 112B for each of the native language shared libraries 130A and 130B respectively. Native shared libraries 130A and 130B also include bytecode verification information 132A which correspond respectively to native language bytecode call 111A and 111B respectively. It is appreciated that the present invention is readily adaptable to a variety of native language code configurations and the native language code does not necessarily have to be organized in a library configuration.

Figure 2A:
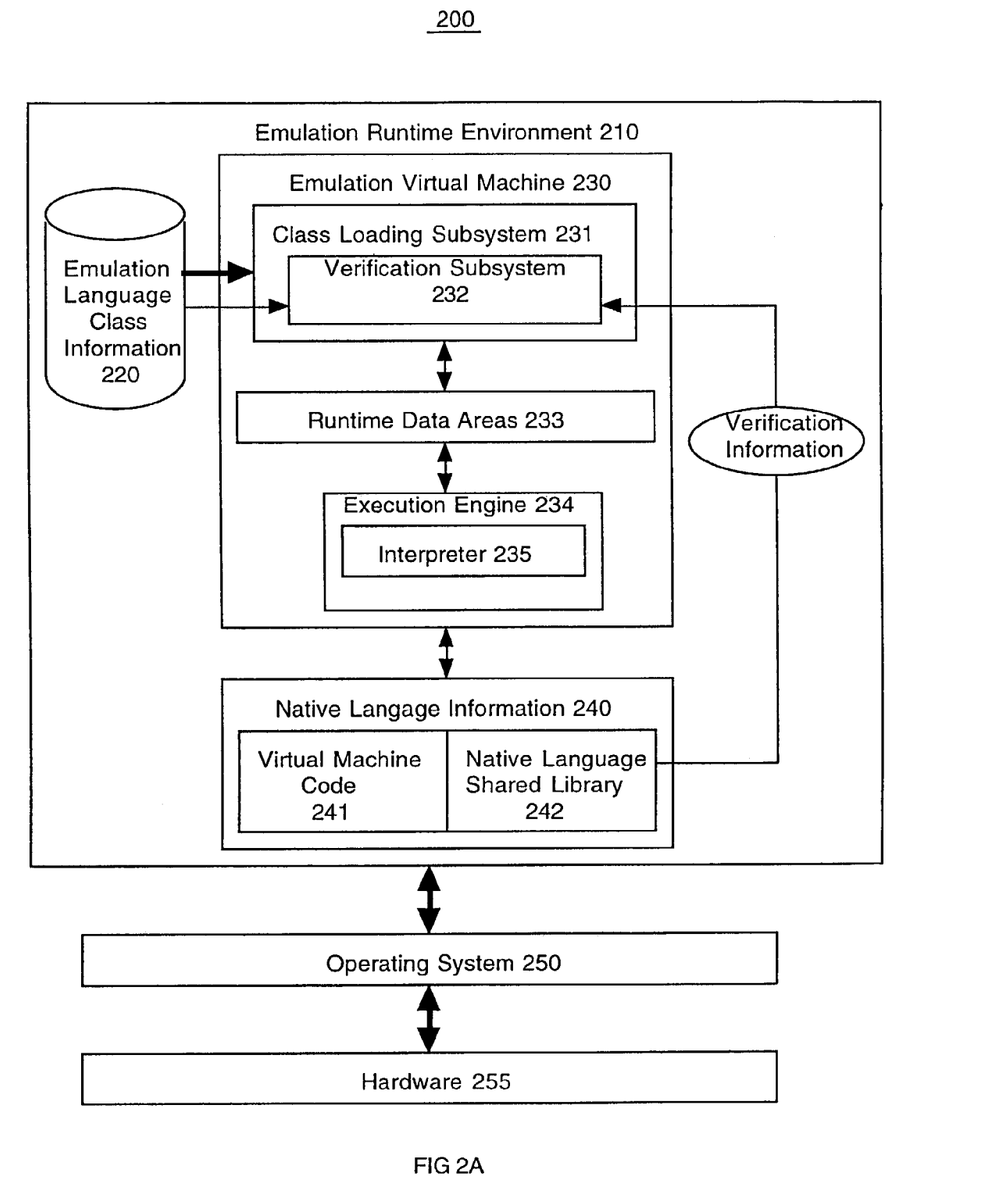
FIG. 2A is a block diagram representation of emulation verification architecture in accordance with one embodiment of the present invention.

FIG. 2A is a block diagram representation of emulation verification architecture 200, an emulation verification architecture in accordance with one embodiment of the present invention. In one exemplary implementation, emulation verification architecture 200 emulates a Java compatible architecture (e.g., compatible with Java virtual machine specification, Java language compatible, Java bytecode compatible, etc.). Emulation verification system 200 comprises emulation verification runtime environment 210, operating system 250 and hardware 255. The components of emulation verification architecture 200 cooperatively operate to run an emulation application (e.g., a Java application) including verification of native language code legitimacy. Emulation runtime environment 210 emulates a processing platform (or "machine") for performing emulation program instructions including invoking and verifying native language code for execution on operating system 250 and hardware 255. Operating system 250 controls the utilization of hardware 255. Hardware 255 includes physical components that perform information manipulations specified by emulation runtime environment 210.

In one embodiment of the present invention, emulation verification runtime environment 210 includes emulation language class information 220 (e.g., Java class information), emulation verification virtual machine 230 (e.g., a Java virtual machine with present invention native language code verification capabilities) and native language information 240. Emulation verification virtual machine 230 provides a platform-independent instruction execution "mechanism" for abstracting and coordinating operating system and processor instructions in a manner that provides emulation processing and verification of emulation language class information 220 and native language information 240 (e.g., native language shared library 242). In one embodiment, emulation language class information 220 comprises bytecodes (e.g., code capable of running on multiple platforms) that provide instructions and data for execution and processing by emulation verification virtual machine 230. In one exemplary implementation, emulation class information 220 includes verification information associated with corresponding native language information. Native language information 240 includes native language virtual machine code 241 and native language shared library 242 comprising native language instructions associated with emulation class information 220. Native language shared library information 242 is subjected to a verification process by emulation verification virtual machine 230, and if verified is passed to operating system 250 and hardware 255.

With reference still to FIG. 2A, emulation verification virtual machine 230 comprises emulation class loading module 231, emulation runtime data area module 233 and emulation execution engine module 234 in one embodiment. Emulation verification virtual machine 230 use a variety of techniques to execute bytecodes (e.g., Java bytecodes) in software and/or varying degrees of hardware. For example, computer readable program code for causing a computer system to implement an emulation virtual machine with native code verification can be embodied on a computer usable storage medium. Class loading module 231 verifies the legitimacy of emulation language class information 220 (e.g., Java bytecode information) and native language shared library 242 information. Emulation language class information is loaded if it is legitimate (e.g., verified as secure for loading). Runtime data area 233 defines and tracks assignment of logical memory locations associated with executing methods and processing data of loaded classes. Execution engine 234 (e.g., an execution module) provides a "mechanism" for executing instructions and processing data included in bytecodes of loaded classes.

Emulation class loading module 231 verifies emulation class and native language information and places emulation class information into memory (e.g., runtime data area 233) for processing. In one embodiment of the present invention, emulation class loading module 231 is Java compatible. Emulation class loading module 231 verifies native language legitimacy be performing a native language verification process (e.g., native language verification method 500).

In one embodiment of the present invention, class loading subsystem 231 includes a verification subsystem 232 that verifies or checks the validity of emulation language class information 220 and native language shared library 242 information before completing the information loading on emulation verification virtual machine 230. In one exemplary implementation of the present invention, class loading subsystem 231 includes a plurality of class loaders configured in a flexible call loader architecture that permits a Java application to load classes in a customized manner, including native language information verification by each of the class loaders. When the class information and native language verification information are loaded, class loading subsystem 231 transfers control for processing and execution of the data and instructions to runtime data area 233 and execution engine 234. In an alternate embodiment of the present invention, verification subsystem 232 is included in execution engine 234 instead of class loading subsystem 231 and native language information is verified when it is called during runtime.

Runtime data area 233 can be flexibly adapted to be compatible with a variety of different memory characteristics. In one embodiment, each instance of emulation virtual machine 230 has a method area and a heap area which can be shared by multiple threads running inside the emulation virtual machine 230. When emulation virtual machine 230 loads class file information, it parses type information from the binary data contained in the class file and places this type information into a method location of runtime data area 233. As an emulation language program (e.g., Java program) proceeds, emulation virtual machine 230 places objects the emulation language program instantiates onto a heap location of runtime data area 233. Runtime data area 233 can include a stack area (e.g., a Java stack, a native language stack, etc.) which stores the state of method invocations. Runtime data area 233 can also include a program counter "register" area for indicating the next instruction of the emulation language program to execute.

Referring still to FIG. 2A, execution engine 234 executes bytecode instructions included in emulation class information 220. In one exemplary implementation, each bytecode instruction includes an opcode that indicates the operation to be performed and can include an operand that provides information associated with the operation. Execution engine 234 fetches an opcode and related information (e.g., operands and/or data stored in other areas) and performs the instructions indicated by the opcode. In one embodiment of the present invention, execution engine 234 includes an interpreter 235. Interpreter 235 interprets the emulation program bytecode (e.g., Java program) information and retrieves native language information (e.g., native language instructions). The interpreted bytecode activity can be monitored and more heavily utilized bytecodes can be adaptively optimized. In one exemplary implementation, execution engine 234 interprets the bytecode information one instruction at a time. In an another exemplary implementation, a just-in-time compiler compiles the bytecode information into a native language machine code the first time a method is invoked and stores the native language machine code in cache, permitting faster execution and thereby mitigating some performance detractions (e.g., slower processing) otherwise associated with virtual machines.

Figure 2B:
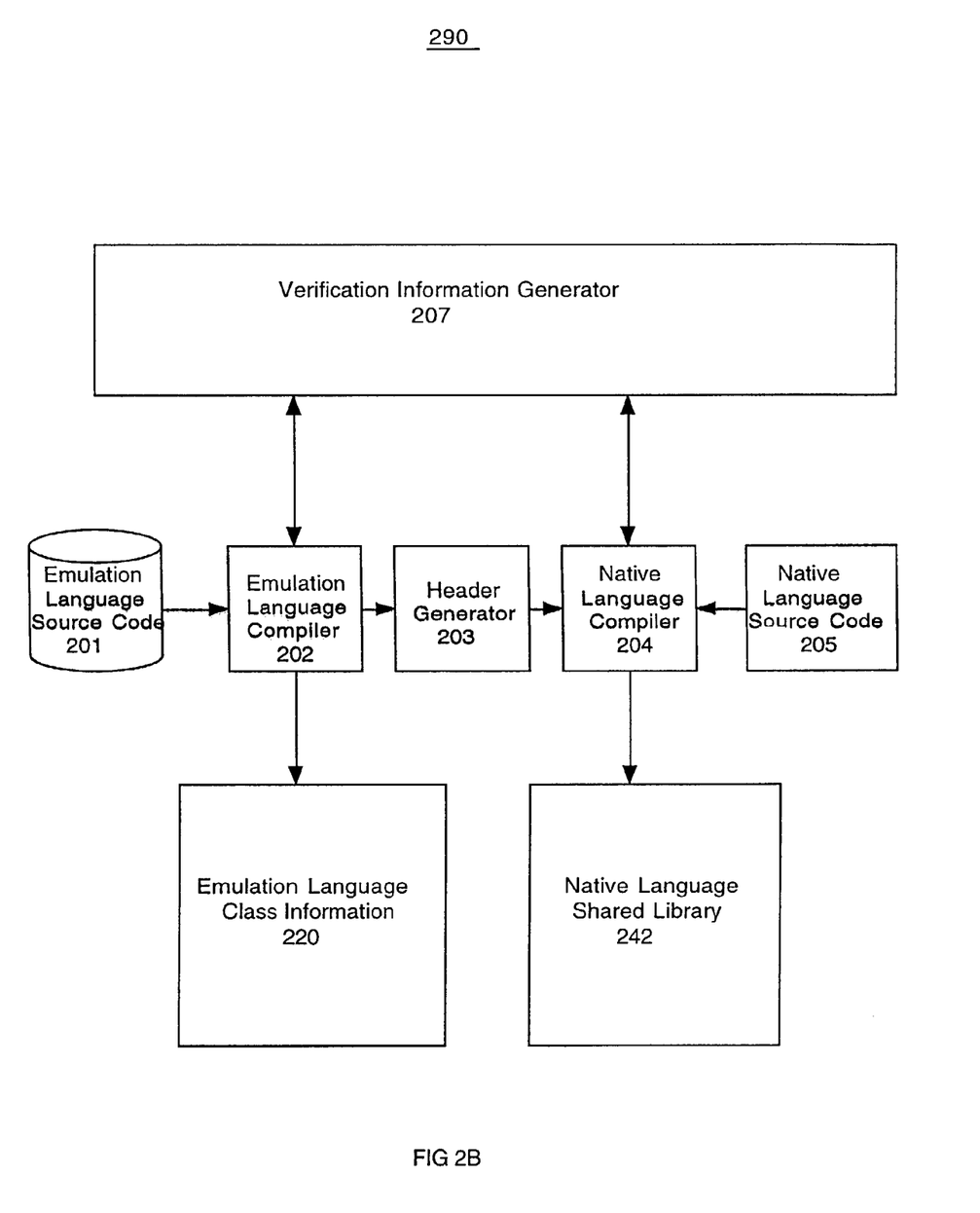
FIG. 2B is a block diagram of emulation language and native language generation system in accordance with one embodiment of the present invention.

In one embodiment of the present invention, emulation language class information 220 and native language shared library 242 are generated remotely and communicated via a network to emulation verification architecture 200. FIG. 2B is a block diagram of emulation language and native language generation system 290, in accordance with one embodiment of the present invention. Native language generation system 290 includes emulation language source code 201, emulation compiler 202, header generator 203 (e.g., a Javah tool), native language compiler 204, native language source code 205 and verification information generator 207. Emulation source code 201 and native language source code 205 include emulation language and native language instructions respectively. Emulation compiler 202 compiles or translates emulation source code 201 into bytecode included in emulation language class information 220 for utilization in an emulation verification runtime environment (e.g., emulation verification runtime environment 210) and provides information to header generator 203. Emulation compiler 202 can also embed or attach verification information in emulation language class information 220. Header generator 203 provides header files associated with native source code 205 which together are provided to native language compiler 204 for creation of native language shared library 242. Native language compiler 204 can also embed or attach verification information in native language shared library 242.

Figure 4A:
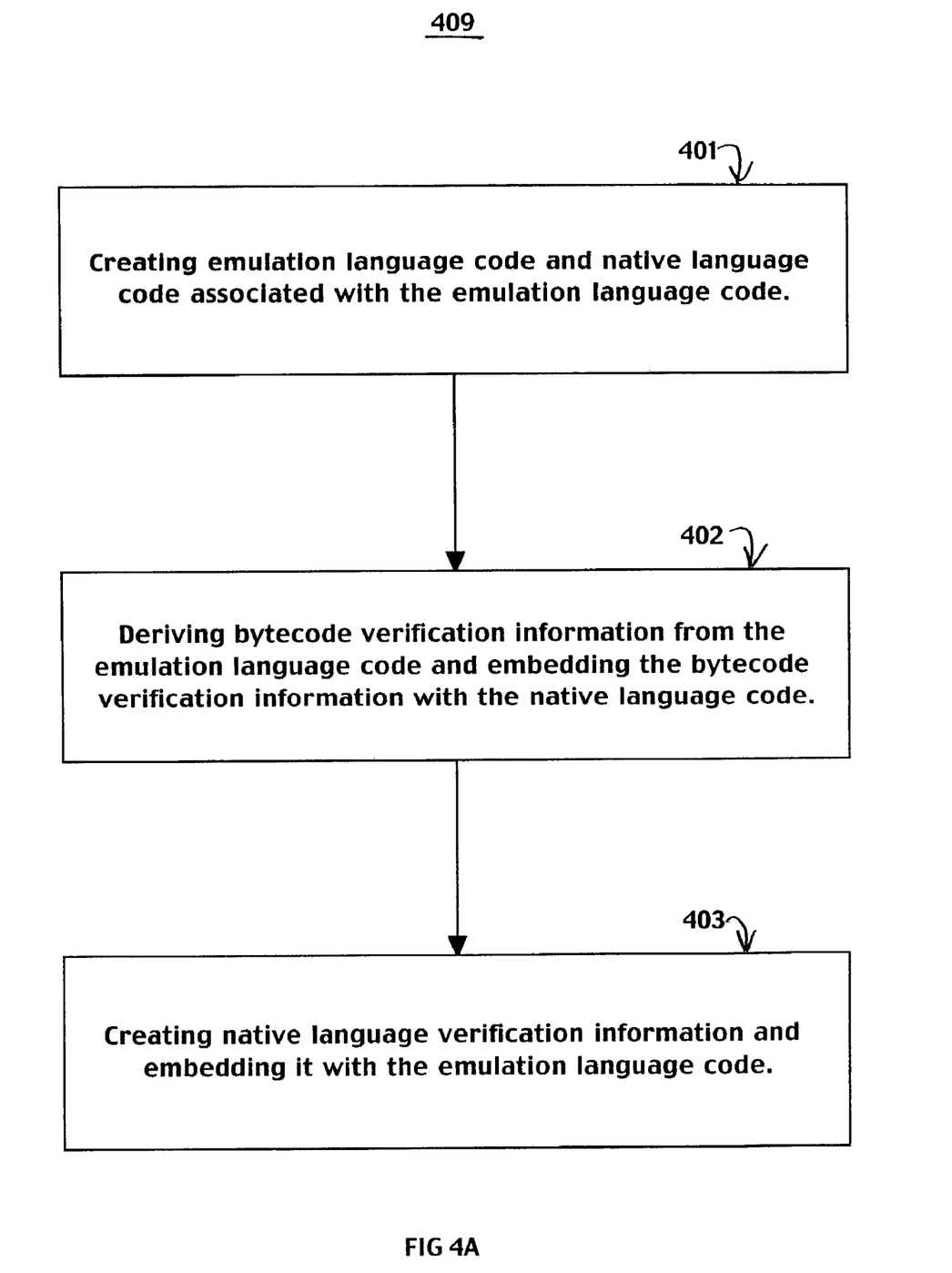
FIG. 4A is a flow chart of an emulation class definition and associated native language information creation method in accordance with one embodiment of the present invention.

Verification information generator 207 generates verification information for inclusion in emulation language class information 220 and native language shared library 242. In one embodiment of the present invention, verification information generator 207 generates native language verification information and bytecode verification information by encoding native language code and emulation class bytecode. For example, generator 207 can perform a variety of encoding functions, including hashing, checksum (e.g., CRC), etc. In one exemplary implementation, verification generator 207 is utilized in an emulation class definition and associated native language creation process (e.g., in accordance with emulation class definition and associated native language creation method 409) to generate bytecode verification information (e.g., utilized in step 402) and native language verification information (e.g., utilized in step 403) which are embedded by emulation language compiler 202 and native language compiler 204 in emulation language class information 220 and native language shared library 242.

Figure 3A:
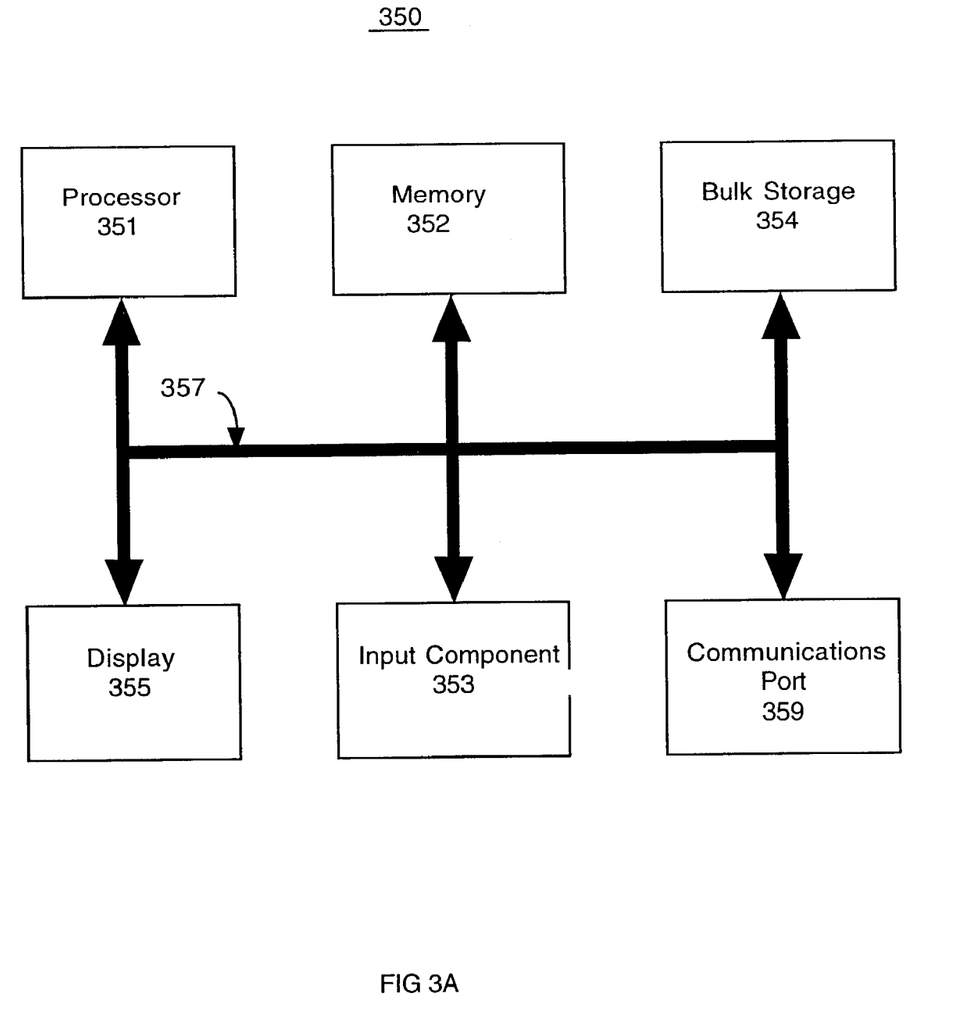
FIG. 3A is a block diagram of a computer system on which the present invention can be implemented.

FIG. 3A is a block diagram of emulation verification system 350, one embodiment of a computer system on which the present invention may be implemented. For example, computer system 350 can be utilized to implement emulation verification architecture 100 and Java verification system 200. Computer system 350 includes communication bus 357, processor 351, memory 352, input component 353, bulk storage component 354 (e.g., a disk drive), network communication port 357 and display module 355. Communication bus 357 is coupled to central processor 351, memory 352, input component 353, bulk storage component 354, network communication port 359 and display module 355. The components of computer system 350 cooperatively function to provide a variety of functions, including performing a "machine" emulation with native language verification capabilities in accordance with a present invention. Communication bus 357 communicates information. Processor 351 processes information and instructions, including instructions for validating the legitimacy of native language code. In one embodiment of the present invention, processor 351 performs a native language verification process (e.g., native language verification method 500). Memory 352 stores information and instructions, including instructions for validating the legitimacy of native language code. Bulk storage component 354 also provides storage of information. Input component 353 facilitates communication of information to computer system 350. Display module 355 displays information to a user. Network communication port 359 provides a communication port for communicatively coupling with a network.

Figure 3B:
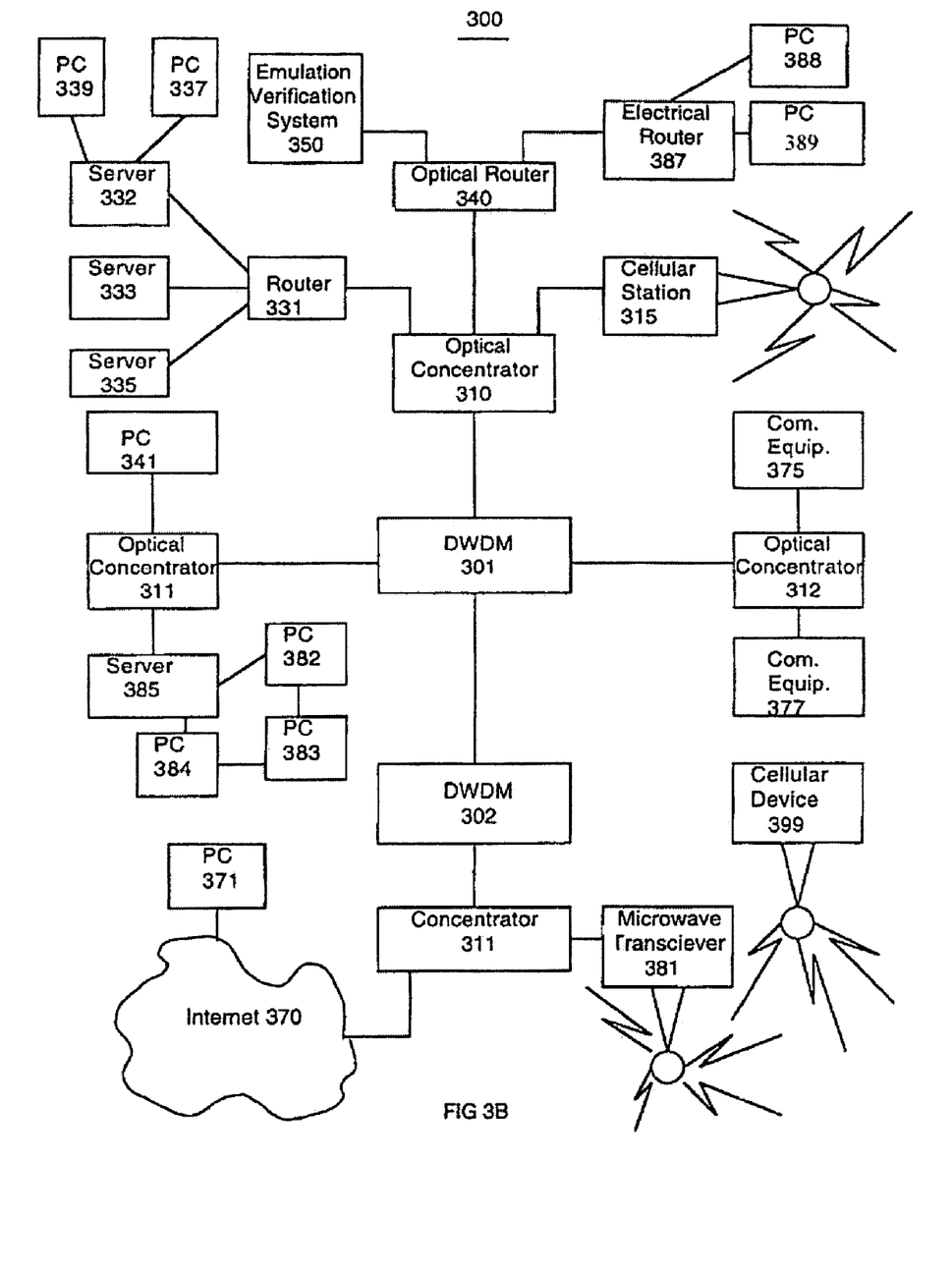
FIG. 3B is a block diagram of one exemplary communication network for communicating native language information in accordance with one embodiment the present invention.

In one embodiment, the present invention is implemented on devices (a computer system, embedded devices, etc.) connected via a communication network. FIG. 3B is a block diagram of communication network 300, one exemplary communication network in accordance with the present invention. In one embodiment of the present invention, emulation class information (e.g., emulation class information 11, 111, 220, etc.) and native language code information (e.g., native language shared library 30, 130, 242, etc.) are communicated via communications network 300. Communication network 300 comprises emulation verification system 350, dense wave division multiplexer (DWDM) 301 and 302, optical concentrators 310, 311, 312 and 317, routers 331, 340 and 387, cellular station 315, cellular device (e.g., phone, handheld computer, etc.) 399, microwave transceiver 381, Internet 370, servers 385, 332, 333 and 335, personal computers 337, 339, 341, 371, 382, 383, 384, 388 and 389, and miscellaneous communication equipment 375 and 377. The components of communications network 300 communicate with each other over a variety of architectures utilizing numerous communication protocols. One exemplary implementation of communications network 300 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc.

FIG. 4A is a flow chart of emulation class definition and associated native language information creation method 409, one embodiment of a present invention emulation class definition and associated native language information creation method. Emulation class definition and associated native language code creation method 409 creates verification information and code for emulation applications. Emulation class definition and associated native language information creation method 409 is utilized to provide verification information associated with native language code. The verification information can be utilized to facilitate security measures directed towards preventing unauthorized code insertion (e.g., code intended to maliciously tamper with an emulation program). In one exemplary implementation, instructions for performing method 409 are stored in a computer readable medium (e.g., a computer readable memory, disk, etc.). It is appreciated that method 409 can be implemented on a variety of hardware configurations, including a computer system (e.g., computer system 350), an embedded system and/or on a network (e.g., network 300).

In step 401, emulation language code and native language code associated with the emulation language code are created. In one embodiment, the emulation code includes code segments that define a class (e.g., code segments included in a Java class definition). The emulation language code segments can include fields and methods. In one embodiment of the present invention, the native language code (e.g., native language code 131) can be a native language method (e.g., a C language function and/or subroutine).

In step 402, bytecode verification information (e.g., bytecode verification information 132) derived from the emulation language code (e.g., Java bytecode 111) is embedded with the native language code (e.g., native language code 131). In one exemplary implementation, the bytecode verification information is an encoded value (e.g., a CRC sum, hash digest, etc.) of the corresponding emulation language code. For example, bytecode verification information 132 is a hash digest value of bytecode 111. The bytecode verification information can be appended to the native language code or portions of the bytecode verification information can be interspersed within the native language code in a predetermined pattern.

In step 403, native language verification information (e.g., native language verification information 112) is created and embedded with the emulation language code (e.g., Java bytecode 112). In one embodiment of the present invention, the native language verification information is an encoded value (e.g., a CRC sum, hash digest, etc.) of the native language code in addition to the assigned bytecode verification information. The native language verification information can be assigned to a native language bytecode verification variable included in an emulation language file (e.g., a class variable or static field included in Java class 210). For example, native language verification information 112 can be a hash digest value of native language code 131 in combination with bytecode verification information 132. The verification information (e.g., bytecode verification information and/or native language verification information) can be a bit sequence.

In one embodiment of the present invention, verification information (e.g., native language verification information 112) can be signed. In one exemplary implementation, the native language verification information can be encrypted (e.g., a native language verification information digital signature). A native language verification information signature can be based upon the a private key encryption and pubic key decryption. For example, a "digital fingerprint" that corresponds to a bit sequence expression of the native language code (e.g. a hash digest created with a hash function) is created and encrypted by a private key algorithm function. The present invention is readily adaptable to a variety of verification bit sequence implementations. In an alternate embodiment, the verification bit sequence can be a checksum, for example a cyclic redundancy check (CRC), and the checksum can be encrypted. In one embodiment the emulation class information is signed (e.g., Java Class 210 is signed by an encoded value).

Figure 4B:
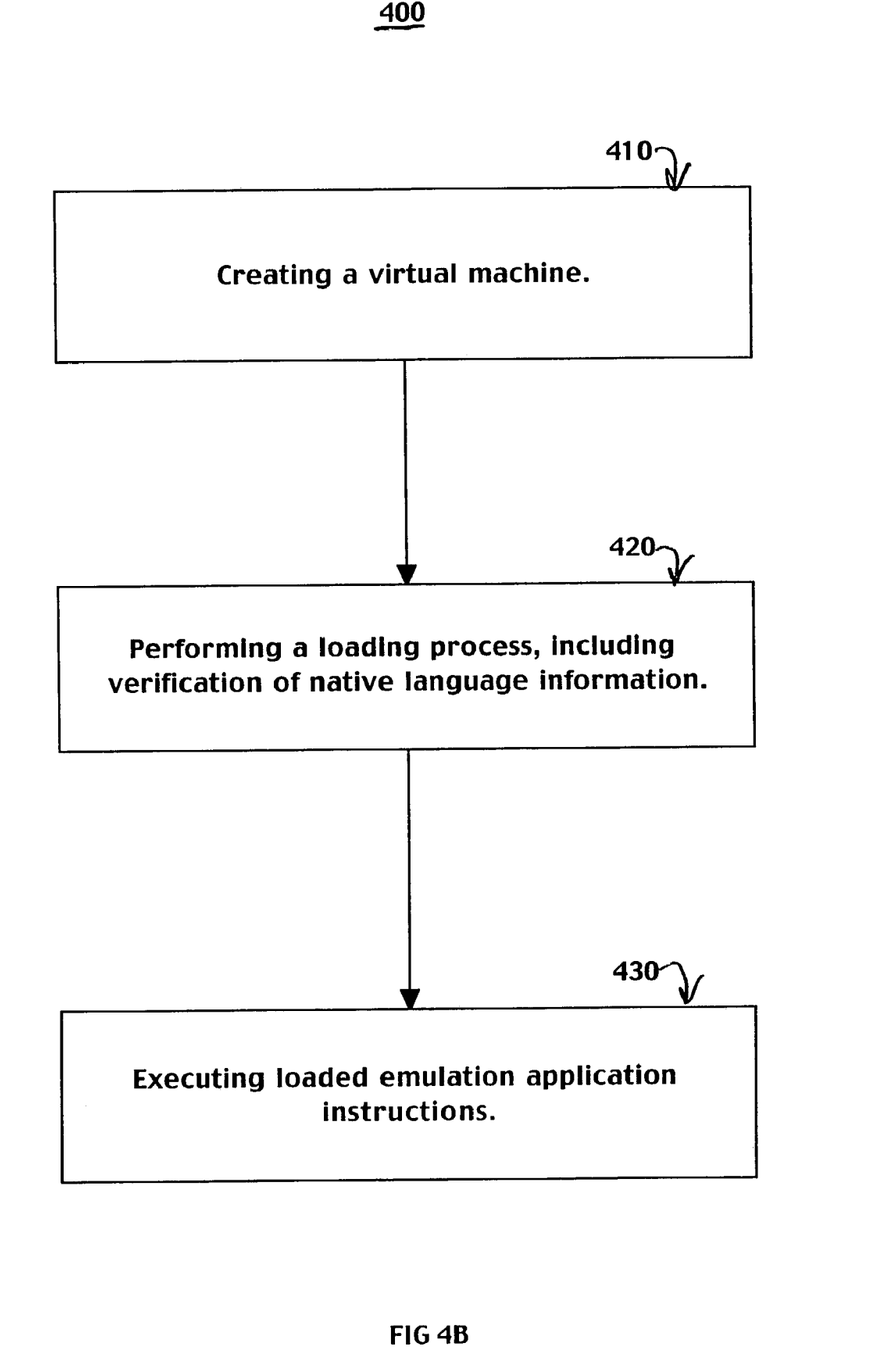
FIG. 4B is a flow chart of one embodiment of a present invention processing emulation method.

FIG. 4B is a flow chart of processing emulation method 400, one embodiment of the present invention. Computer emulation method 400 provides emulation of a virtual "processing machine" with native language code verification capabilities. In one embodiment of the present invention, processing emulation method 400 is compatible with Java standards and includes additional native language information verification capabilities. In one exemplary implementation, instructions for performing processing emulation method 400 are stored in a computer readable medium (e.g., a computer readable memory, disk, etc.). Processing emulation method 400 can be implemented on a variety of computer platforms (e.g., computer system 350 and/or embedded devices) and/or across different networks (e.g., network 300).

In step 410, a virtual machine is created (e.g., emulated) for processing emulation application instructions. In one embodiment, the virtual machine is a Java virtual machine for running Java applications. For example, running a Java application inside a runtime instance on a hardware implementation of an abstract emulation specification defining the Java virtual machine.

At step 420, a loading process is performed, including verification of native language information (e.g., included in a native language shared library). The verification of native language information can be performed during emulation language loading. For example, when a Java virtual machine loads a class file it also determines legitimacy of native language code (e.g., included in a native language shared library) associated with calls included in the emulation language code (e.g., an analysis of whether the information has been maliciously altered is performed). Alternatively, the verification of native language information can be performed during run time loading of native language information. Performing the verification during an emulation language information loading time facilitates conservation of execution time by preventing class information that is not verified from loading. It also provides conservation of execution time by enabling one verification check for the contents of a shared library associated with class call. Performing the verification at native language load time facilitates conservation of processing activities by reducing time on checking the native language shared library contents if not actually utilized at run time. In one exemplary implementation, a verification process or method is performed to verify the native language information (e.g., included in a native language shared library).

Figure 5A:
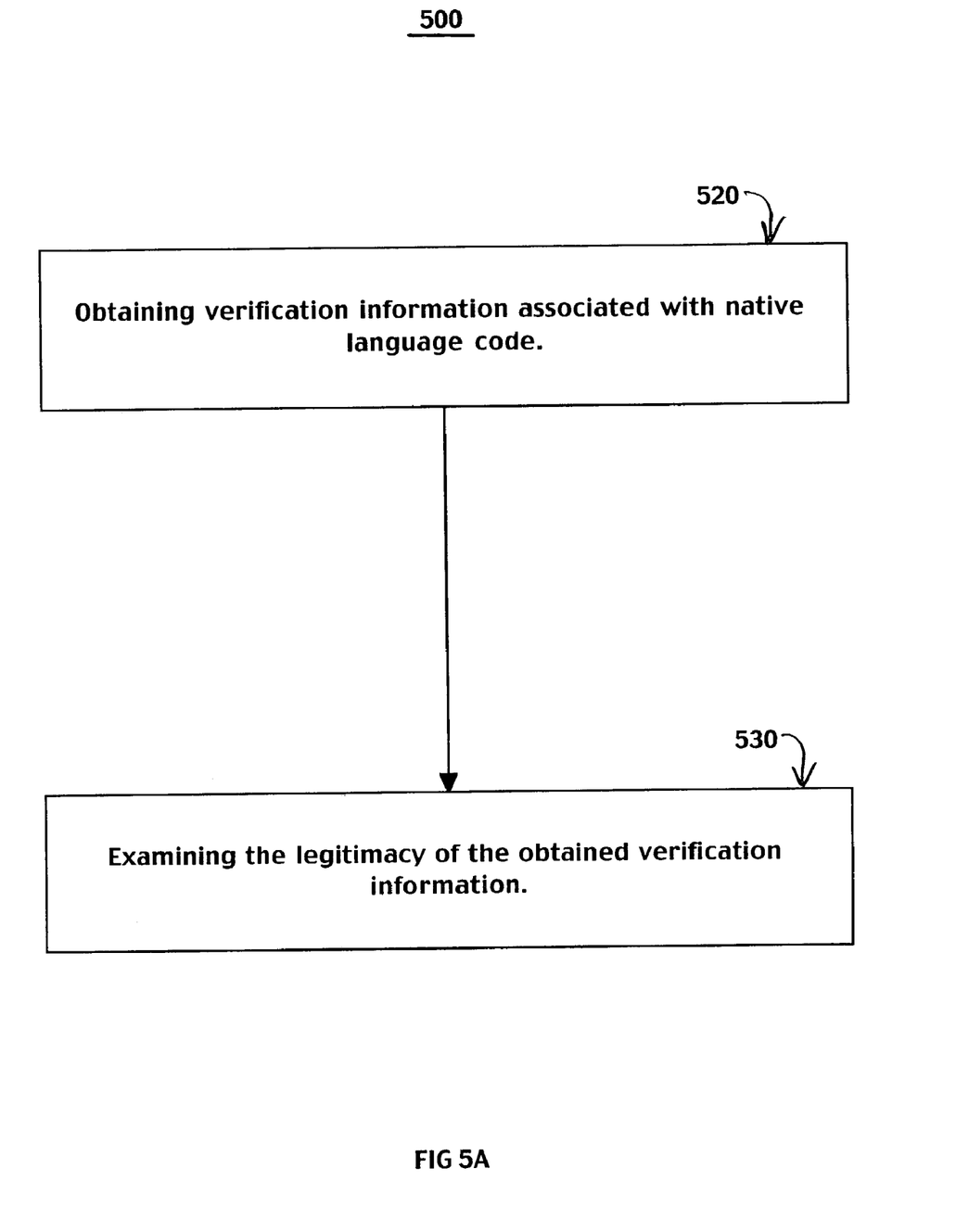
FIG. 5A is a flow chart of one embodiment of a present invention native language verification method.

Referring now to FIG. 5A, a flow chart of a native language verification method 500 is shown, one embodiment of a present invention verification process. Native language verification method 500 verifies or validates the legitimacy of native language code (e.g., that native language code is not corrupted by unauthorized manipulation). In one exemplary implementation, instructions for performing native language verification method 500 are stored in a computer readable medium (e.g., a computer readable memory, disk, etc.). It is appreciated that native language verification method 500 can be implemented on a variety of hardware configurations, including a computer system (e.g., computer system 350), an embedded system and/or on a network (e.g., network 300).

In step 520, verification information is obtained. The verification information can be obtained from an emulation language class file, a native language shared library, and/or dynamically generated (e.g., on the fly at load time). The verification information is associated with native language code referred to by an emulation language class (e.g., a class compatible with Java specifications). In one embodiment of the present invention, the retrieved verification information can be bytecode verification information and/or native language verification information. The retrieved verification information can be a code creation version from steps 402 and/or 403 of emulation class definition and associated native language information creation method 400 shown in FIG. 4. In one exemplary implementation, the verification information can be associated with legitimate or corrupted code (e.g., malicious code). For example, the verification information can be a load time version that is generated dynamically by performing a hash function on corrupted incoming native language information. The generated verification information is compared to other obtained predetermined verification information (e.g., code creation version native language verification information included in a Java class file) that is presumed to be legitimate. The process continues to step 530 to determine if the verification information is associated with legitimate or corrupted code.

With reference to step 530 of FIG. 5, the legitimacy of the obtained verification information is examined. In one embodiment of the present invention, the examination confirms if native language code is uncorrupted (e.g., by malicious tampering that alters the information and/or introduces a virus, pointers to incorrect memory locations, instruction to clandestinely forward system information to an unauthorized location, etc.). In one exemplary implementation, the verification information is analyzed to determine if it conforms to a predetermined relationship. For example, code creation verification information (e.g., a code creation version) is analyzed to determine if the code creation verification information exhibits appropriate correspondence to a load time verification value. Permission to load the requested native language code is granted if the examination indicates the native language code is not corrupted. Permission to load the requested native language code is denied if the examination indicates the native language code is not corrupted.

Figure 5B:
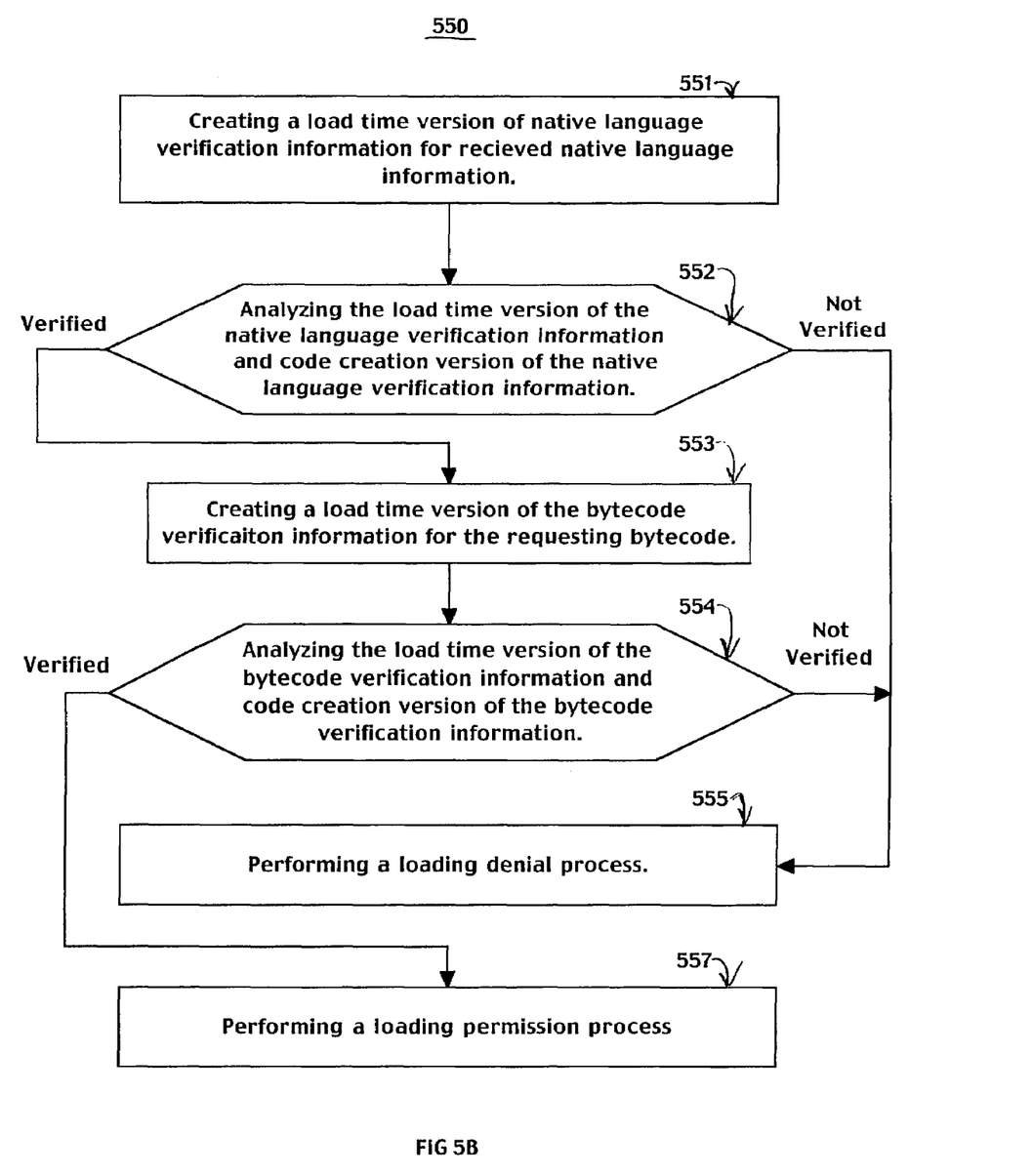
FIG. 5B is a flow chart of a verification analysis method in accordance with one embodiment of the present invention.

FIG. 5B is a flow chart of verification analysis method 550, a verification analysis method in accordance with one embodiment of the present invention. Verification analysis method 550 is one exemplary implementation of a method for determining if verification information exhibits a correspondence to a predetermined relationship (e.g., matches the predetermined value). Verification analysis method 550 can be utilized to facilitate examination of verification information in step 530. In one exemplary implementation, instructions for performing native language verification method 550 are stored in a computer readable medium (e.g., a computer readable memory, disk, etc.). It is appreciated that native language verification method 550 can be implemented on a variety of hardware configurations, including a computer system (e.g., computer system 350), an embedded system and/or on a network (e.g., network 300).

In step 551, an emulation virtual machine creates a load time version of verification information for the received native language. In one embodiment, a load time version of native language verification information is created in a manner similar to a code creation version (e.g., created in step 403) of native language verification information (e.g., a similar hash or checksum algorithm is used). For example, if the code creation version of the native language verification information is an encoded value (e.g., checksum, hash, etc.) of native language code and bytecode verification information, the run time version of the native language verification information is a similar algorithm generated encoded value (e.g., checksum, hash, etc. respectively) of the received native language information.

In step 552, the load time version of the native language verification information and the code creation version of the native language verification information are analyzed. In one embodiment of the present invention, the load time version of the native language verification information and the code creation version of the native language verification information are analyzed to determine if predetermined correspondence is exhibited (e.g., are equal, are related by an algorithm, etc.). In one exemplary implementation, the load time version of the native language verification information and the code creation version of the native language verification information are compared to determine if a predetermined correspondence is exhibited. If the load time version of the native language verification information and the code creation version of the native language verification information do not exhibit a predetermined correspondence to the received native language code the process proceed to step 555. If the load time version of the native language verification information and the code creation version of the native language verification information do exhibit a predetermined correspondence the process proceeds to step 553.

With reference now to step 553 of FIG. 5B, an emulation virtual machine creates a load time version of verification information for the emulation code that requested the native language information. In one embodiment, a load time version of bytecode verification information is created in a manner similar to a code creation version (e.g., created in step 402) of bytecode verification information. For example, if the code creation version of the bytecode language verification information is an encoded value (e.g., checksum, hash, etc.) of the bytecode, the run time version of the bytecode language verification information is an encoded value (e.g., checksum, hash, etc. respectively) of the bytecode requesting the native language information. A similar checksum or hash digest can be used to create the load time version of the bytecode language verification information and the code creation version of the bytecode language verification information.

In step 554, the load time version of the bytecode language verification information and the code creation version of the bytecode language verification information are analyzed. In one embodiment of the present invention, the load time version of the bytecode language verification information and the code creation version of the bytecode language verification information are analyzed to determined if a predetermined correspondence is exhibited (e.g., are equal, are related by an algorithm, etc.). In one exemplary implementation, the load time version of the bytecode language verification information and the code creation version of the bytecode language verification information are compared to determine if the predetermined correspondence is exhibited. If the load time version of the bytecode language verification information and the code creation version of the bytecode language verification information do not exhibit a predetermined correspondence to the received native language code the process proceeds to step 555. If the load time version of the bytecode language verification information and the code creation version of the bytecode language verification information do exhibit a predetermined correspondence the process proceeds to step 557.

With reference still to FIG. 5B, a loading denial process is performed in step 555. In one embodiment of the present invention, a loading denial process denies permission for an emulation class to be loaded. In one embodiment of the present invention, emulation class information is not loaded if native language information referenced by the emulation class (e.g., called from a native language shared library) is not verified. The loading denial process can also deny permission to load classes involved in a dependency relationship. In yet another embodiment, the emulation application is not loaded and executed if native language information (e.g., included in a native language share library) is not verified. In one embodiment in which verification is performed during native language loading, the emulation class is permitted to load and an exception is issued if a call is made to native language information that is not verified.

In step 557, a loading permission process is performed. Permission to load emulation class information at emulation code load time and to load associated native language information at runtime is granted if the associated verification information is legitimate (e.g., exhibits a predetermined correspondence). In one embodiment, appropriate adjustments are made to classes involved in dependency relationships with the classes that are not verified. For example, the present invention can remove from a first class references that establish a dependency relationship to a second class if the second class does not pass the verification process.

Referring back now to step 430 of FIG. 4, loaded emulation application instructions are executed. In one embodiment of the present invention, the execution of the emulation application instructions are implemented in a variety of ways, including implementations that are compatible with standard Java specification emulation requirements. For example, a Java runtime instance is executed as a thread of a Java virtual machine execution engine.

In one embodiment of the present invention, processing emulation method 400 can also include an emulation class file verification process that focuses on verifying the emulation class information in addition to native language information verification during step 420 loading. For example, processing emulation method 400 can include a Java class file verifier that performs structural, semantic, bytecode and symbolic reference verification checks. The structural verification can confirm the sequence of bytes being imported as a type conforms to a valid basic Java class file structure (e.g., is compatible with Java standard specifications). The semantic check on the type data can verify that individual components are well-formed instances of a valid component type and that the class itself adheres to accepted Java programming language specifications. During bytecode verification the Java virtual machine can perform a data-flow analysis on bytecodes streams that represent methods of a class. In addition, if symbolic references included in a class file are resolved as part of a dynamic linking process, the Java machine can check that references to other class files are correct and compatible.

The emulation class file verification process can also include a verification process in which the emulation class file contents are verified as trustworthy and not altered en route to the virtual machine. The verification of the class file contents can be implemented by utilizing a verification bit sequence directed to the class file. In one embodiment, the class file verification bit sequence is the same as bytecode verification information or alternatively the class file verification bit sequence and the bytecode verification information are different. For example, a class file signature can be created utilizing hash digest of the class file encrypted with a private key. The class file signature can be included in the class file bytecode (e.g., appended as an operand). In one embodiment, a class file is included in a Java Application Reservoir (JAR) and the JAR is provided with a signature. When the class file is loaded, the virtual machine applies the hash algorithm to the class file contents and compares the results to a decrypted version of the signature conveyed with the class file. In one embodiment, the security restrictions placed on an emulation class file by the emulation security management module (e.g., a Java security management module) can be altered according to the signature of the class file.

Thus, the present invention provides security that native language loaded in association with an emulation class is legitimate and does not include corrupted code (e.g., bits altered by a malicious user, virus, etc.). The present invention facilitates avoidance of native language code that points to an incorrect address, overwrites a memory block with "bad" data, causes a buffer to overflow and/or includes a virus. Processing of calls to native language methods communicated in a network environment in accordance with the present invention are less susceptible to security breaches and resulting undesirable and undetected consequences. A variety of emulation code (e.g., Java code) optimization activities can be performed with increased security assurances, including calling native language code that speeds up performance of time critical code, utilizes legacy system data, and/or accesses features of an underlying host platform that are otherwise inaccessible in an emulation environment (e.g., Java environment).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the Claims appended hereto and their equivalents.

What is claimed is:

1. A computer usable storage medium having computer readable program code embodied therein for causing a computer system to implement an emulation virtual machine with native code verification comprising:

an emulation class loading module for verifying the legitimacy of emulation class information and associated native language information and loading said emulation class information if legitimate, wherein said emulation class loading module retrieves a first version of native language verification information from a particular emulation class and compares the first version to a second version that is a load time version of said native language verification information based upon information received from a native language shared library and wherein said native language verification information is a hash digest of native language code with embedded bytecode verification signature;

an emulation execution module for executing instructions and processing data included in bytecodes of loaded emulation classes; and an emulation runtime data area module for tracking assignment of logical memory locations associated with said loaded emulation classes.

2. A computer usable storage medium of claim 1 wherein said emulation class loading module is Java compatible.

3. A computer usable storage medium of claim 1 wherein said emulation class loading module performs a native language verification method.

4. A computer usable storage medium of claim 1 wherein said hash digest is encrypted by a private key and decrypted by a corresponding public key.

* * * * *